US008016195B2

(12) United States Patent
Persson

(10) Patent No.: US 8,016,195 B2
(45) Date of Patent: Sep. 13, 2011

(54) METHOD AND ARRANGEMENT FOR VERIFYING ITEMS OF MAIL

(75) Inventor: Jan Persson, Ljungby (SE)

(73) Assignee: Stralfors AB, Ljungby (SE)

( * ) Notice: Subject to any disclaimer, the term of this patent is extended or adjusted under 35 U.S.C. 154(b) by 498 days.

(21) Appl. No.: 12/095,782

(22) PCT Filed: Nov. 29, 2006

(86) PCT No.: PCT/SE2006/001354

§ 371 (c)(1),
(2), (4) Date: Sep. 19, 2008

(87) PCT Pub. No.: WO2007/064276

PCT Pub. Date: Jun. 7, 2007

(65) Prior Publication Data

US 2009/0020599 A1 Jan. 22, 2009

(30) Foreign Application Priority Data

Dec. 2, 2005 (SE) .................................... 0502658-8

(51) Int. Cl.
*G06K 7/00* (2006.01)

(52) U.S. Cl. .................... 235/436; 235/375; 235/462.01

(58) Field of Classification Search .................. 382/101; 209/509–707

See application file for complete search history.

(56) References Cited

U.S. PATENT DOCUMENTS 4,787,192 A 11/1988 Gunther, Jr.
5,494,544 A 2/1996 Hill et al.
6,385,504 B1 5/2002 Pintsov et al.
7,482,549 B2 * 1/2009 Madar et al. .................. 209/584
2004/0218958 A1 11/2004 Kruger et al.
2008/0170747 A1 * 7/2008 Dilanchian .................. 382/101

FOREIGN PATENT DOCUMENTS

EP 1388820 2/2004
EP 1 543 990 A2 6/2005
WO 0143053 6/2001
WO 0215034 2/2002

* cited by examiner

*Primary Examiner* — Thien M. Le
*Assistant Examiner* — Christle Marshall
(74) *Attorney, Agent, or Firm* — Tarolli, Sundheim, Covell & Tummino LLP

(57) ABSTRACT

The present invention concerns a method and an arrangement for the verification of individually presented items of mail provided with individually unique machine-readable identification codes, where the identification code of a presented item of mail is read and the identification code that has been read is checked against machine-readable information about intended items of mail and their status, whereby the current item of mail is a) removed if the identification code is not present in the intended items of mail or if it is illegible, and b) the status of the current item of mail is checked against the machine-readable information about intended items of mail and their status in order to determine whether the current item of mail has previously been delivered. If the current item of mail has previously been delivered, the current item of mail is removed. If the current item of mail has not previously been delivered, the information about the status of the current item of mail is updated with information that the current item of mail has been delivered and the current item of mail is allowed to pass as a verified delivery. Furthermore, an item of mail that has been approved for delivery is retained until a subsequent item of mail has been identified and approved for delivery.

20 Claims, 2 Drawing Sheets

METHOD AND ARRANGEMENT FOR VERIFYING ITEMS OF MAIL

BACKGROUND OF THE INVENTION

The present invention concerns a method and an arrangement for verifying that individually presented items of mail provided with individually unique machine-readable identity codes. In particular, a method and an arrangement are concerned that identify individual items of mail and check whether these agree with information concerning expected items of mail.

The use of individually unique identity codes in a machine-readable form in order to guide and regulate the combination of units to one item of mail is previously known.

The information that is coupled to the codes is normally stored as mail information in a database and it can be used to guide and regulate printers, to identify and regulate the combination of individual units, such as individual sheets of paper, to one item of mail, to guide and regulate folding, choice of envelope, combination, sealing and franking of the item of mail. This process is often named "enveloping" and the equipment for it is known as "enveloping machines".

Currently available enveloping machines have a very high reliability, but it does happen that errors arise, given the high speeds of processing that current productivity requirements demand. There may, for example, arise errors in the handling (not only the mechanical handling but also the logical handling) such that an item of mail is incomplete, duplicated, or such that a displacement of the intended contents between items of mail takes place. It may also happen that an operator intervenes and causes a second, sometimes larger and more extensive error, in an attempt to correct an error.

When an error arises and a job may encompass a large number, possible many thousands, of items of mail, it is easy to realise that it will be difficult to identify which of the individual items of mail must be produced again. It may be the case, if the job is an important one, that the complete job must be rerun and the correct items of mail that were produced in the partially unsuccessful run must in this case be destroyed. The requirement for destruction is a result of the desire to ensure to avoid the risk of sending duplicate, something that is directly expensive should the items of mail contain value coupons, checks or similar, and indirectly expensive should it be the case that it will irritate customers and create negative feelings among them.

Thus, there are shortcomings in the prior art technology with respect to verifying individually presented ready-to-post items of mail.

It is thus one aim of the present invention to reduce or eliminate shortcomings within the prior art technology and to achieve an efficient verification of ready-to-post items of mail.

It is a further aim to achieve information that can be used for reliable follow-up of production.

BRIEF DESCRIPTION OF THE INVENTION

The aims described above can be achieved with a method or an arrangement according to the attached independent patent claims.

The method for verifying individually presented items of mail is conditional upon the items of mail being provided with an individually unique identification code, and this method is characterised by the steps:

that the identification code of a presented item of mail is read, that the identification code that has been read is checked against machine-readable information concerning intended items of mail and their status, whereby the current item of mail is removed if the identification code is not present among the intended items of mail or if it is illegible, the status of the current item of mail is checked against the machine-readable information concerning intended items of mail and their status in order to determine whether the current item of mail has already been previously delivered and i) if the current item of mail has been previously delivered, the current item of mail is removed, ii) if the current item of mail has not been previously delivered, the information about the status of the current item of mail is updated with information that the current item of mail has been delivered, and the current item of mail is allowed to pass as a verified delivery.

Through reading in this way the identity of ready-to-post items of mail and checking them against information about intended items of mail, verified information is obtained concerning which items of mail from a job are really ready to be distributed onwards. If several items of mail are missing, information concerning which items can be read from the machine-readable information about intended items of mail and their status, whereby the information required can be fed back to a production unit for repeat production of only these items, in a manner that is obvious for one skilled in the arts.

The time at which the verification of the current item of mail can advantageously be specified, in one embodiment, during the updating of the information about intended items of mail and its status with information that the relevant item of mail has been delivered.

Thus it can be determined during a follow-up operation which items of mail were completed during the first run of the job and which items of mail were produced during a subsequent supplementary run, if this was necessary. It may be the case, of course, that further runs will be necessary before a job is complete. Alternatively, if it can be accepted that certain items of mail are not delivered, it is possible to determine from the information which individuals are concerned.

It is possible in a further embodiment that an item of mail that has been approved to be sent is retained until a subsequent item of mail has been identified and approved for delivery. If the said subsequent item of mail is found during checking to be associated with an error and for this reason is to be removed, the previously approved but retained item of mail is also removed and updating of the machine-readable information about intended items of mail and their status takes place.

This may be carried out since if an error occurs in subsequent items of mail, there is a clear risk that the error is coupled with the preceding item of mail. As an example, the situation can be mentioned in which the final page of a letter is placed first in the subsequent letter through displacement. It is probable in this case that the first page, which normally contains address information and the identification code that it is intended should be read through the window of an envelope, will be covered. Since the identification code is no longer readable, the item of mail is classified as erroneous and flagged for removal. The preceding item of mail is also removed as a precautionary measure, which is desirable in the case described since one page is missing.

The immediately subsequent item of mail can also be removed in order further to increase the security, whereby the item of mail before and after the item of mail are removed, together with the item of mail that has been identified as erroneous.

The items of mail can in a further embodiment be in motion during the identification and check against the said information about intended items of mail and their status, not only to avoid the formation of jams arising from the combination of relatively high presentation speed and relatively short distance between items of mail, but also since a continuous transport of the items of mail is more gentle and reduces wear on the equipment.

A check of the sequence can be carried out in a further embodiment in which an item of mail is removed if its position in the sequence of items of mail deviates from the sequence prescribed by the information about intended items of mail and their status. This is a further method of increasing the security during the verification.

A level for the degree of error that can be accepted during production can be determined, in order to obviate the necessity of stopping the process and investigating the reason for each individual error. The size of the current job and its degree of importance, for example, may form the basis for this determination. Thus, in one embodiment, a limiting value can be set for when the production is to be stopped and investigation to be carried out. A stop signal is generated when the number of items of mail that have been removed exceeds the limiting value that has been determined, which stop signal may in turn be used, for example, to initiate interruption of the presentation of further items of mail to the arrangement, making possible an investigation into the reason for these removals. The limiting value for the number of errors can be set as an absolute number, or it can be set as a number of consecutive erroneous items of mail.

An identification code that is unique for each design of the outer cover can in a further embodiment be applied onto the outer cover of an item of mail. Also this identification code is read and the two identification codes are checked against machine-readable information about intended items of mail and their status and that the relevant item of mail be removed if the combination of identification codes deviates from what is expected. Also this increases security if, for example, a letter with an identification code that can be read through a window in an envelope and an identification code that can be read on the envelope can be checked such that the letter has been placed into the correct envelope. The term "correct envelope" can denote, for example, an envelope with the correct size, format, company profiling or with the correct information on it. The term "information" can be used to denote, for example, colour, logo, address information, messages, etc.

The arrangement according to the present invention for verifying individually presented items of mail with unique machine-readable identification codes is characterised in that: transport means are arranged to receive and transport an item of mail presented to the arrangement along a defined path with a constant speed, that a code-reading means is arranged at or in the vicinity of the initial part of the transport pathway in order to read the identification code of a passing item of mail, that control means are connected to the code-reading means and comprising information about intended items of mail and their status, that the control means comprises logical control rules for the comparison of the identification code that has been read against information about intended items of mail and their status, resulting in a decision made whether an item of mail is correct or erroneous, that the control means comprises means to update the said information about intended items of mail and their status when a correct item of mail has passed, that an ejection means that is connected to the control means for regulation of the ejection of an item of mail is arranged at or in the vicinity of the final section of the linear transport path, which ejection means is capable of regulating the ejection of the item of mail into a first position for a verified delivery if the control means has determined that the item of mail is correct and into a second position if the control means has determined that the item of mail is erroneous.

With an arrangement of the type defined here it will be possible to identify an incoming item of mail rapidly, to classify it, and—if it is correct—to check it off in a list for documentation purposes. This list can subsequently be used in a subsequent follow-up of production and in order to create a new work order or a new job for any items of mail that are missing.

The code-reading means is adapted to the code selected and it is preferably intended for contact-free reading. A camera with image recognition ability or with text recognition ability, laser-based bar code readers, etc., can be mentioned as examples of code-reading means.

The control means may in one embodiment comprise means for calculating the total number of erroneous items of mail, and means that are capable of raising a signal when the number of erroneous items of mail reaches a predetermined limiting value, which signal can be used to interrupt the presentation of the items of mail to the arrangement.

The ejection means may comprise means for the retention of an item of mail until the subsequent item of mail has been identified and a decision has been taken of whether the said subsequent item of mail is correct or erroneous.

Furthermore, the ejection means can be capable of, in the event that the said subsequent item of mail is erroneous, ejecting the retained item of mail into the second position as being erroneous and capable of updating, in interaction with the control means, the information about intended items of mail and their status that this has been carried out.

The transport means in one embodiment may comprise an endless band that is driven at a speed that is essentially the same or that exceeds the speed at which items of mail are presented to the arrangement, with a number of wheels that are placed under spring tension against the band arranged along the said path, which wheels are intended to ensure the contact of a passing item of mail against the driven band in order to ensure secure transport. It is required that the items of mail are transported onwards at the same speed as that at which they are presented, in order to avoid the formation of jams in the arrangement. The contact wheels increase the friction between the items of mail and the band, which increases the security of the transport.

The ejection means may comprise two driving wheels facing each other arranged after the transport means and arranged to interact with an item of mail that has passed the transport means, whereby the driving wheels are arranged such that they can be regulated in a manner that retains an item of mail and subsequently eject it. The desired retention function can be achieved by regulating the driving wheels with rapid acceleration and retardation.

The ejection means can comprise a regulated direction selector arranged downstream of the transport means and intended to regulate the possible ejection pathway of an item of mail by alternative interactions with the items of mail, whereby the direction selector is preferably a door arranged such that it can pivot, that influences a passing item of mail by pivoting between a first position and a second position, and in this manner regulates the possible ejection pathway of the item of mail.

The transport means may comprise a plane surface, over which a part of the item of mail can support and slide during its complete passage through the arrangement or during parts of it.

The code-reading means may comprise several code-reading arrangements, making it possible to read at different positions of an item of mail.

The code-reading means may be arranged for reading on opposite sides of the item of mail.

A means for diverting an item of mail may be arranged upstream of the transport arrangement, which means of diverting an item is capable of diverting items of mail that are presented to the arrangement in the event of mechanical breakdown or stoppage of the arrangement.

Other aims and advantages of the invention will be obvious for one skilled in the arts who studies the attached drawings and the attached detailed description of preferred embodiments, which are not limiting for the invention.

DETAILED DESCRIPTION OF PREFERRED EMBODIMENTS OF THE INVENTION

Figure 1:
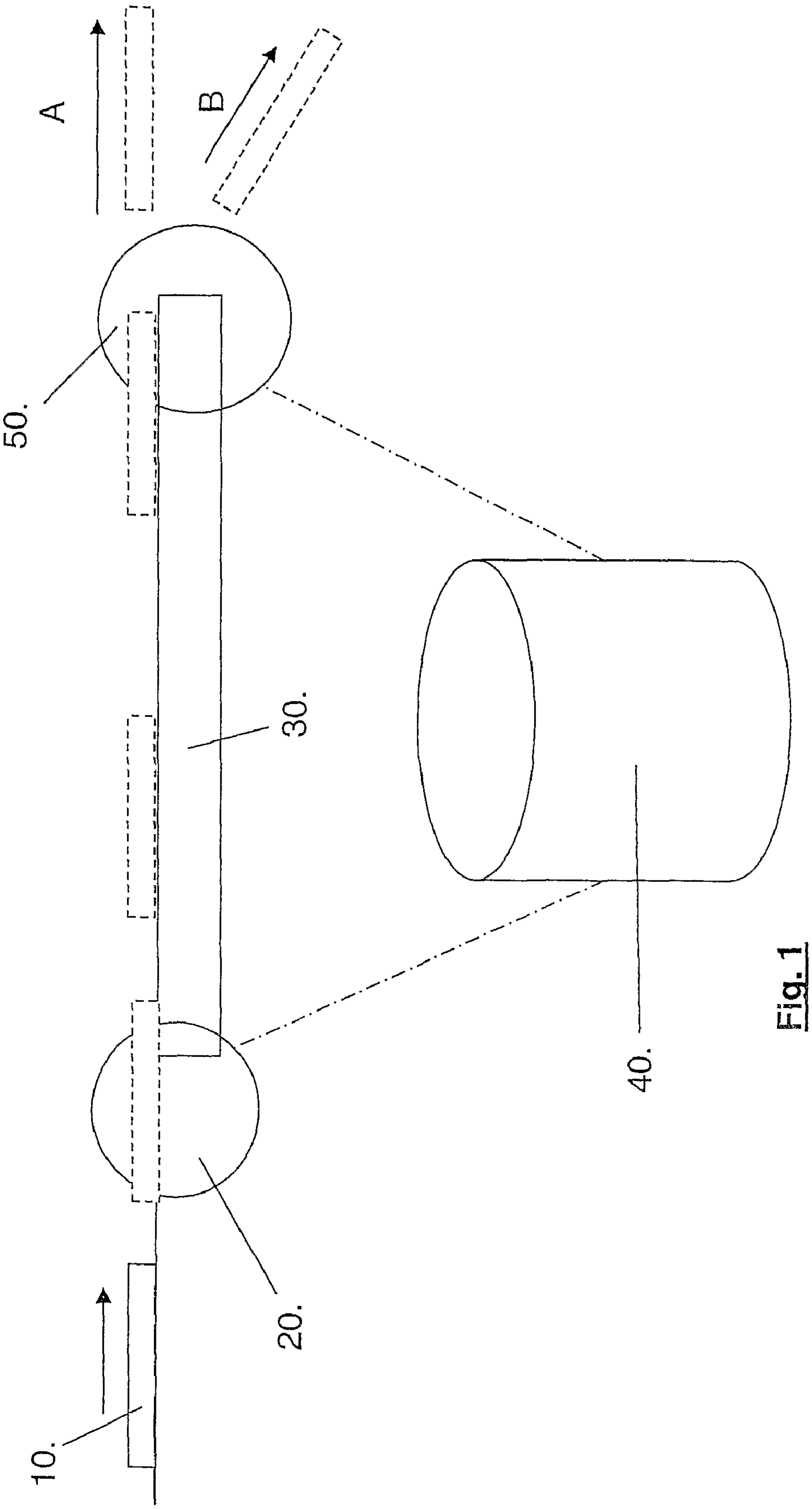
FIG. 1 shows schematically the principles in an arrangement according to the present invention.

FIG. 1 shows schematically how an item of mail 10 is presented to an arrangement according to the present invention. The item of mail may be a letter, a package, or another type of item of mail that has been formed by the bringing together of two or more components. The presented item of mail 10 passes a code-reading means 20, which may be one or several units placed at one or several locations around the passing item of mail, and the item of mail passes in association with this into interaction with a transport means 30 that transports the item of mail along a pathway while the code that has been read is compared with information about intended items of mail and their status through interaction with a control means 40. After the check has been carried out, the result is used to regulate by means of an ejection means 50 how the item of mail is to be ejected, such as correct and thus verified for further delivery through a first delivery position A, or as erroneous and thus for removal through a second delivery position B. If the item of mail is ejected as a correct item of mail through the first position A, also the information about intended items of mail and their status is updated such that it is possible to determine from this information that the item of mail has been delivered.

Figure 2:
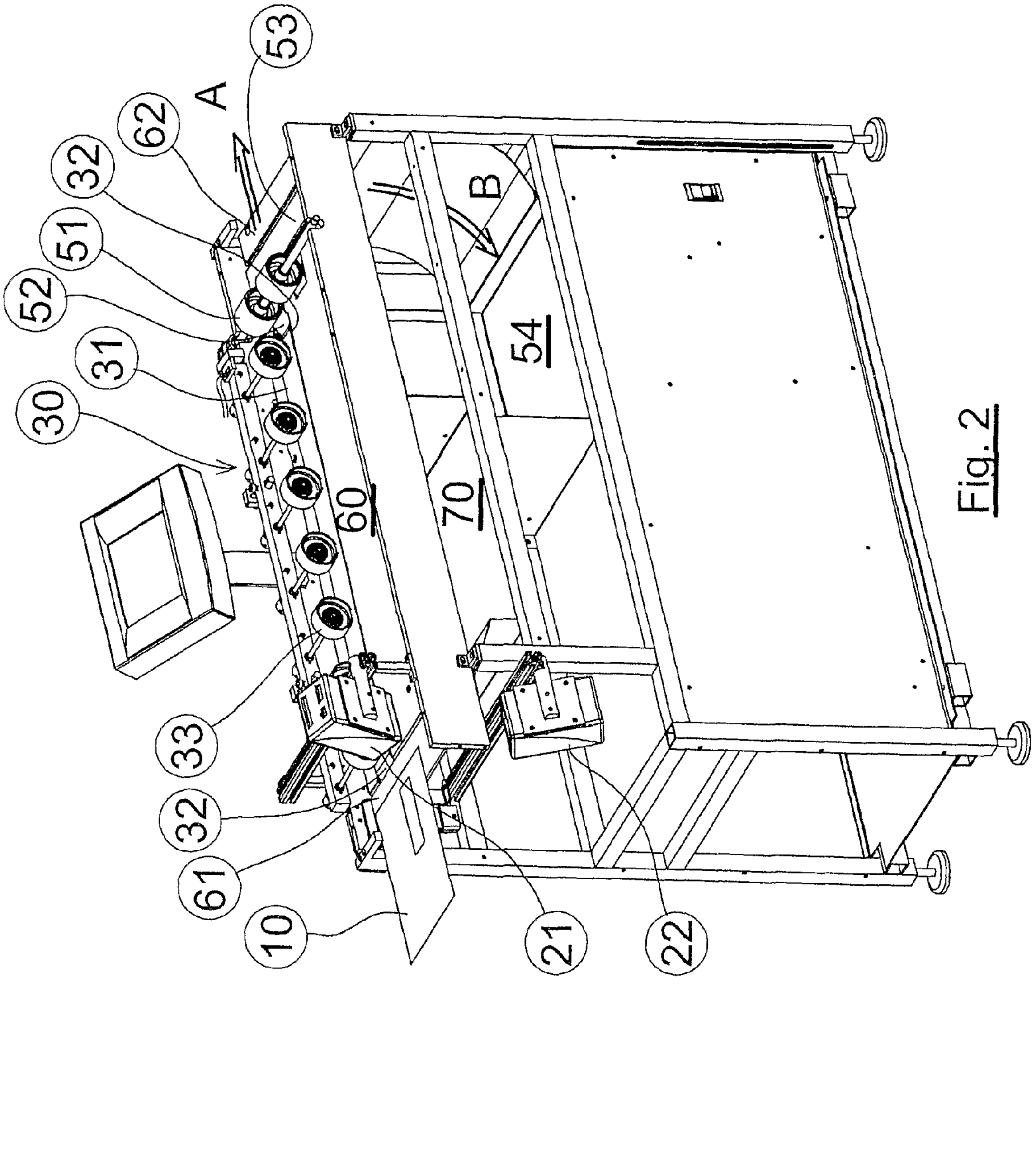
FIG. 2 shows schematically and in a partially exploded view an arrangement according to an embodiment of the present invention.

FIG. 2 shows schematically a control arrangement for letters 10. The letters may, for example, be presented from an enveloping machine, not shown in the drawing. The control means consists of a table that has a table surface 60 over which letters are transported one at a time from an inlet end 61 to an outlet end 62, from left to right in the drawing.

A code-reading means having a bar code reader 21 is arranged to read the identification code on the upper surface of an arriving letter 10. A further bar code reader 22 is arranged in the present embodiment in order to be able to read from below a bar code on the lower surface of the letter. The reason for this is not only that we desire in certain operating applications to be able to read codes placed on different sides of a single item of mail, but also to deal with the fact that certain enveloping machines deliver letters with the address window on the upper surface while others deliver letters with the address window on the lower surface. A transparent section 61, through which reading of the code may take place, has been arranged at the inlet end in the present embodiment, in order to facilitate the reading of codes on the lower surface of the letter. This possibility to read the code may be achieved in alternative embodiments also by reading through, for example, an open slit.

A letter that arrives at the inlet end 61 passes into interaction with a driven transport band 31. The transport band 31 is an endless band that passes over two break rollers 32, at least one of which is driven by a motor, preferably of the type known as a "servomotor". The use of a servomotor or similar ensures that it is possible to calculate the position of the current item of mail at all times during the transport by careful regulation of the motor.

The part of the transport band pathway that is active for the interaction of the item of mail is in this case located directly above the surface 60 of the table, or in the case in which a cavity or depression is present in the table surface at the level of this, and it is capable of gripping through frictional force a presented envelope 10, and drawing this along with it over the surface of the table to the outlet end 62.

In order to increase the friction and reduce the risk that the letter slides along the band, a number of contact wheels 33 have here been placed along the active part of the band 31, the function of which wheels is to ensure that a letter is in contact with the band 31. The contact wheels 33 are arranged such that they can be swung out of the way and they are arranged under spring tension in the direction towards the band 31, in order to allow differing thicknesses of the items of mail. Although we are here using the term "letter", it must be understood that "letter" also comprises other plane items of mail such as essentially plane packages with, for example, CD disks or DVD disks, or other contents that in the context of items of mail have an essentially plane form with two principal surfaces. Other examples of composite items of mail are postcards or similar where, for example, a printed card is to be combined with information that is written or glued onto, and with address information that is, similarly, written or glued onto the card.

The distances between the wheels 33 is adapted such that at least one wheel makes contact with the item of mail at every position along the path that the item of mail is transported by the transport band 31.

Furthermore, in order to make possible what is known as "sequence control", the present embodiment after the transport band 31 has two pairs of motor-driven rollers 51, 52 that are placed under spring tension arranged opposite to each other and directed in opposite directions relative to each other. These pairs of rollers have parallel axes of rotation arranged in a common plane. The pairs of rollers are so arranged that a letter that is transported over the surface 60 of the table and leaves the active part of the transport band 31 will be threaded in between the pairs of rollers 51 and 52.

The directions of rotation of the pairs of rollers 51, 52 are directed in opposite directions and they can be regulated such that they can retain a letter by decelerating to a stationary condition while the letter is positioned between them. The letter can be fed onwards by accelerating and restarting the rotations of the rollers.

A pivoted door 53 is arranged in order to regulate the direction in which a letter is ejected, which door is located in a first position in a plane parallel to the active part of the transport band and thus constitutes an extension of the surface 60 of the table for the ejection of a correct and verified letter into a first position A.

In the event that a letter is classified as erroneous and requiring removal, the door is pivoted upwards in order to adopt a second position and a letter that is fed forwards will come into contact with the door and it will be caused by this to change its direction in order to be ejected into a second position B, into a collecting box 54. Collecting rejected letters in one location makes it subsequently possible to carry out investigations into the reasons that the letters have been rejected.

It is an advantage if the pivoted door 53 is rectangular and arranged to pivot with its axis of pivot transverse to the direction of transport of the letter and parallel to the surface 60 of the table. The door 53 is furthermore arranged such that its free end can be pivoted upwards, above the surface of the table and upstream of the pivot axis of the door relative to the direction of transport of the letter, a path that exceeds the thickness of the letter while not exceeding an angle of opening of 80 degrees, whereby a letter that makes contact with the door during ejection will be deflected down into the open door to a space 54 that is arranged under the door.

It is preferable that the angle of opening of the door is 30-60 degrees, and in the present embodiment approximately 40 degrees.

In the event of a jam or breakdown of the arrangement, a means of diverting items of mail is arranged upstream of the transport arrangement, which means can divert items of mail that are presented to the arrangement. The means of diverting items of mail has in the present embodiment a rectangular door 61 that is arranged such that it can pivot, arranged with its axis of pivot transverse to the direction of travel of the letter and parallel to the surface 60 of the table. Furthermore, the door 61 is arranged such that its free end can be pivoted upwards, above the surface of the table an extent that exceeds the thickness of the letter while not exceeding an angle of opening of 80 degrees, whereby a letter that makes contact with the door during presentation will be deflected down when it comes into contact with the lower surface of the door and led down through the open door 61 into a space 70 that is arranged under it. It is preferable also in this case that the angle of opening of the door is 30-60 degrees, and in the present embodiment approximately 40 degrees.

It is preferable that a stop signal is raised in the event of a jam or breakdown, which stop signal can be used to interrupt the presentation of items of mail to the arrangement, and in order to activate the means of diverting items of mail. The high speed at which the items of mail are normally delivered requires that it is possible to collect items of mail that cannot be received in the control arrangement in order to avoid these items of mail being damaged.

The arrangement according to the present embodiment has a control panel with a touch-sensitive display connected to a computer for regulation of the logical circuits and the items that are driven, and for the control and update routines of the arrangement.

The function of the present embodiment is as follows:

When a job is to be run, the computer is provided with information about intended items of mail and their status using a method that is known to one skilled in the arts, and the transport means and transport band are started.

The identity of the first letter is read when the letter arrives, and it enters into interaction with the transport band. The computer carries out the following steps, described here in general terms, while the letter is being transported by the transport band:

1. Was it possible to read the identity? If yes, continue to nest step; if no, the letter is erroneous.
2. Is the identity among the information about intended items of mail and their status? If yes, continue to nest step; if no, the letter is erroneous.
3. Has the letter been previously delivered? If no, continue to next step; if yes, the letter is erroneous.
4. Update the information about intended items of mail and their status with the information that the present letter has been delivered, time for delivery is specified.

The next event is that when the letter approaches the ejection means it is threaded in between the rotating pairs of rollers 51, 52. In a first operating condition, the pair of rollers only transport the letter onwards without carrying out any other function. At essentially the same time, the computer instructs the pivoted door 53, or to be more accurate the means of driving this door, about the position that it is to adopt.

If the incoming letter is not erroneous, i.e. if it is correct, the door is regulated such that it is in a plane position for ejection of the letter into a first position A. If the incoming letter is erroneous, the door is opened for ejection of the letter into a second position B.

The regulation of the door 53 can take place by means of a regulating driving means familiar to one skilled in the arts that meets the requirements for speed that the selected speed of presentation requires, such as a servomotor or a magnetic coil of turning or drawing type.

In a second operating condition, in which also the subsequent letter is to be checked before the current letter is finally approved, the pair of rollers 51, 52 is regulated to rapidly retard to a full stop when the letter is positioned between them in order to retain the letter while the subsequent letter undergoes the investigation described above.

When this has take place, either the computer indicates that the subsequent letter is correct and the retained letter can for this reason be finally delivered through position A, or it is indicated that the retained letter is to be classified as erroneous and after updating of the information about intended items of mail and their status the letter is ejected through position B.

In a third operating condition, the computer can also check the sequence of the subsequent letter against the sequence as specified by the information about intended items of mail and their status. If the sequence is erroneous, the letter is classified as erroneous and it will for this reason be discarded together with the temporarily approved and retailed letter.

In a further operating condition, also the letter after the letter for which an error has been discovered can be classified as erroneous and removed.

The arrangement has naturally a further operating condition in which no checks are made. In this case the transport means and the ejection means function solely as transporters.

In an alternative operating condition to the first one described above, two code readers can be used and a further machine-readable identification code is placed onto the envelope. A new point is then added after either point 2 or point 3 above:

Does the combination of identification codes agree with the information about intended items of mail and their status? If yes, continue to next point; if no, the letter is erroneous.

Further transporters can be arranged after the arrangement that has been described here, or there can be a collection and transfer in standard carriers from the current distributor, such as a postal network or another supplier of logistical services.

The embodiments that have been described above and shown in the attached drawings are intended only as non-limiting examples of how the invention may be realised in practical use. One skilled in the arts will be able with the guidance of this document to discover further embodiments according to the present invention, as it is defined in the attached patent claims.

The invention claimed is:

1. A method for the verification of individually presented items of mail provided with machine-readable identification codes unique for the item of mail, the method comprising the steps of:

reading the identification code of a presented item of mail, checking the identification code that has been read against machine-readable information about intended items of mail and their status, removing the current item of mail if the identification code is not present on the intended items of mail or is illegible, checking the status of the current item of mail against the machine-readable information about intended items of mail and their status in order to determine whether the current item of mail has previously been delivered; and i) if the current item of mail has previously been delivered, the current item of mail is removed ii) if the current item of mail has not previously been delivered, the information about the status of the current item is updated with information that the current item of mail has been delivered and the current item of mail is allowed to pass as a verified delivery, and an item of mail that has been approved for delivery is retained until a subsequent item of mail has been identified and approved for delivery.

2. The method according to claim 1, wherein when updating the information about intended items of mail and their status with information that the current item of mail has been delivered, the time at which the verified delivery of the current item of mail took place is specified.

3. The method according to claim 1, wherein if it has been determined after checking that the subsequent item of mail is to be removed, the item of mail that has already been approved but retained is also removed, and the machine-readable information about intended items of mail and their status is updated.

4. The method according to claim 3, wherein the subsequent item of mail is also removed.

5. The method according to claim 1, wherein the item of mail is in motion during the identification check against the information about intended items of mail and their status.

6. The method according to claim 1, wherein a sequence check is carried out in which an item of mail is removed if its position in the sequence of items of mail deviates from the sequence specified in the information about intended items of mail and their status.

7. The method according to claim 1, wherein when the number of items of mail that have been removed exceeds a predetermined limiting value, a stop signal is raised in order to initiate an interruption of the presentation of further items of mail to the arrangement, making it possible to investigate the reasons for the removals, the limiting value for the number of items of mail that has been removed being determined as the number of consecutive erroneous items of mail.

8. The method according to claim 1, wherein a second identification code located on the outer cover of the item of mail and unique for each design of outer cover is read, the identification codes being checked against machine-readable information about intended items of mail and their status, and the current item of mail being removed if the combination of identification codes deviates from that which is expected.

9. The arrangement according to claim 1, wherein the identification code of the presented item of mail is read from a first page of a letter in the item of mail.

10. An arrangement for verifying individually presented items of mail (10) provided with individually unique machine-readable identification codes, the arrangement comprising:

transport means (30) arranged to receive and transport an item of mail (10) presented to the arrangement along a defined transport path with a constant speed, a code-reading means (20) arranged at or in the vicinity of an initial part of the transport path in order to read the identification code of a passing item of mail (10), control means (40) connected to the code-reading means and including information about intended items of mail and their status, the control means (40) including logical control rules for the comparison of the identification code that has been read against information about intended items of mail and their status, resulting in a decision made whether an item of mail is correct or erroneous, the control means (40) further including means to update the information about intended items of mail and their status when a correct item of mail has passed, and an ejection means (50) connected to the control means (40) for regulation of the ejection of an item of mail arranged at or in the vicinity of a final section of the transport path, the ejection means (50) regulating the ejection of the item of mail (10) into a first position (A) for a verified delivery if the control means has determined that the item of mail is correct and into a second position (B) if the control means has determined that the item of mail is erroneous, the ejection means (50) including means (51, 52) for retaining an item of mail (10) until the subsequent item of mail has been identified and a decision taken about whether the subsequent item of mail is correct or erroneous.

11. The arrangement according to claim 10, wherein the control means comprises means for calculating the total number of erroneous items of mail and means to raise a signal when the number of erroneous items of mail reaches a predetermined limiting value, the signal being used to interrupt the presentation of items of mail to the arrangement.

12. The arrangement according to claim 10, wherein the ejection means (50), in the event that the subsequent item of mail is erroneous, using means (53) that eject the retained item of mail into the second position (B) as erroneous, the ejection means (50), in interaction with the control means, updating the information about intended items of mail and their status.

13. The arrangement according to claim 10, wherein the transport means comprises an endless band (31) driven at a speed that corresponds to or exceeds the speed with which items of mail are presented to the arrangement, a number of wheels being arranged along the transport path under spring tension against the band to ensure contact between a passing item of mail and the driven band for secure transport.

14. The arrangement according to claim 10, wherein the ejection means comprises two driving wheels (51, 52) facing each other and arranged after the transport means to interact with an item of mail that has passed the transport means, whereby the driving wheels are arranged in a regulated manner to retain an item of mail and subsequently to eject the same.

15. The arrangement according to claim 10, wherein the ejection means comprises a direction selector (53) that is regulated, arranged downstream of the transport means, and regulates the possible ejection pathway of an item of mail, whereby the direction selector is a door arranged such that it pivots, which through its pivoting between a first position and a second position influences a passing item of mail and thus regulates its possible ejection pathway.

16. The arrangement according to claim 10, wherein the transport means comprises a plane surface over which a part of the item of mail is supported and slides during its displacement through the arrangement.

17. The arrangement according to claim 10, wherein the code-reading means comprises more than one code-reading arrangement (21, 22) to read from several positions on an item of mail (10).

18. The arrangement according to claim 17, wherein code-reading arrangements are arranged for reading on opposite sides of the item of mail.

19. The arrangement according to claim 10, wherein a means of diverting items of mail is arranged upstream of the transport arrangement to divert items of mail that are presented to the arrangement in the event of breakdown or stoppage of the arrangement.

20. The arrangement according to claim 10, wherein the code-reading means (20) read identification codes of the presented item of mail from a first page of a letter in the item of mail.

* * * * *